United States Patent

Nakatani et al.

[11] Patent Number: 5,887,114
[45] Date of Patent: Mar. 23, 1999

[54] VIDEO MEMORY DEVICE FOR PROCESSING A DIGITAL VIDEO SIGNAL COMPRISING A SEPARATION MEANS WHICH SEPARATES A HORIZONTAL SYNCHRONIZING SIGNAL FROM A DIGITAL VIDEO SIGNAL

[75] Inventors: Yoshihiro Nakatani, Kanagawa; Tadayoshi Nakayama, Tokyo; Hisataka Hirose, Kanagawa; Tsutomu Fukatsu, Kanagawa; Chikara Sato, Kanagawa, all of Japan

[73] Assignee: Canon Kabushiki Kaisha, Tokyo, Japan

[21] Appl. No.: 395,486

[22] Filed: Feb. 27, 1995

Related U.S. Application Data

[63] Continuation of Ser. No. 105,470, Aug. 11, 1993, abandoned, which is a continuation of Ser. No. 483,351, Feb. 22, 1990, abandoned.

[30] Foreign Application Priority Data

Mar. 2, 1989 [JP] Japan ........................................ 1-50526

[51] Int. Cl.$^6$ ................... H04N 5/95; H04N 9/89
[52] U.S. Cl. ................. 386/90; 386/91; 386/20; 348/497; 360/32
[58] Field of Search ........................ 358/335, 337, 358/338, 339, 310, 320, 321, 323, 13, 19, 149; 360/32, 36.1, 36.2, 37.1; 386/20, 90–91; 348/497; H04N 5/76, 5/78, 5/781, 5/782, 5/783, 5/95, 9/79, 9/89, 5/04, 11/04, 9/145, 9/455

[56] References Cited

U.S. PATENT DOCUMENTS

| | | | |
|---|---|---|---|
| 4,468,698 | 8/1984 | Karoussi et al. | 358/337 |
| 4,635,134 | 1/1987 | Sasamura et al. | 350/312 |
| 4,638,375 | 1/1987 | Motoyama | 358/338 |
| 4,688,081 | 8/1987 | Furuhata et al. | 358/19 |
| 4,772,950 | 9/1988 | Furuhata et al. | 358/337 |
| 4,796,123 | 1/1989 | Takeuchi et al. | 358/339 |
| 4,802,025 | 1/1989 | Shinada | 358/339 |
| 4,802,026 | 1/1989 | Kaneko et al. | 358/339 |
| 4,814,897 | 3/1989 | Kojima et al. | 358/338 |
| 4,835,623 | 5/1989 | Okano et al. | 358/339 |
| 4,864,428 | 9/1989 | Kanamaru | 358/337 |
| 4,933,774 | 6/1990 | Ishimaru | 358/338 |
| 4,951,143 | 8/1990 | Waehner | 358/337 |

Primary Examiner—Douglas W. Olms
Assistant Examiner—David R Vincent
Attorney, Agent, or Firm—Robin, Blecker & Daley

[57] ABSTRACT

A video memory device is provided with a memory circuit, a write control circuit for controlling writing to the memory circuit by utilizing the horizontal synchronizing signal of a video signal input to the memory circuit, and a read control circuit for controlling reading from the memory circuit by utilizing the horizontal synchronizing of a video signal output from the memory circuit.

14 Claims, 2 Drawing Sheets

VIDEO MEMORY DEVICE FOR PROCESSING A DIGITAL VIDEO SIGNAL COMPRISING A SEPARATION MEANS WHICH SEPARATES A HORIZONTAL SYNCHRONIZING SIGNAL FROM A DIGITAL VIDEO SIGNAL

This is a continuation application under 37 CFR 1.62 of prior application Ser. No. 08/105,470, filed Aug. 11, 1993. Now abandoned, which is a continuation application under 37 CFR 1.62 of prior application Ser. No. 483,351, filed Feb. 22, 1990 now abandoned.

BACKGROUND OF THE INVENTION

1. Field of the Invention

The present invention relates to a video memory device.

2. Description of the Related Art

Video recording/reproducing apparatus such as video tape recorders are typically arranged so that, if special reproduction such as still image reproduction, stroboscopic reproduction or slow-motion image reproduction is to be performed utilizing field memories, switching signals for rotary heads or rotation control signals of the rotary heads are utilized to start writing and reading of the field memories. In the case of still image reproduction or stroboscopic reproduction, in order to correct skew corresponding to 0.5 H (H: horizontal period), the switching signal and the rotation control signal are utilized to drive a counter to generate a period signal of one vertical period ±0.5 H, and the period signal is employed to start writing and reading of memory. In this arrangement, one period of reading or writing of memory is made approximately equal to an integral multiple of one horizontal period, and writing and reading are performed in units of horizontal scanning periods, thereby preventing occurrence of skew of 0.5 H.

However, the aforesaid conventional arrangement has a number of problems. For example, if a video signal input to a memory includes jitters due to variations in the speed of rotation of the rotary head during recording and reproduction, a video signal written into the memory during each period is not always equal to an integral multiple of one horizontal scanning period. With regard to reading from the memory, the period of an output video signal is not always equal to an integral multiple of one horizontal period. For these reasons, if writing to the memory is halted or intermittently repeated while reading from the memory is repeated as in the case of still image reproduction, stroboscopic reproduction or slow-motion image reproduction, a skew may be formed at the gap between successive reading cycles. If such an output video signal is supplied to a television set, the image displayed on a screen is too curved to be easily identified.

SUMMARY OF THE INVENTION

It is therefore an object of the present invention to provide a video memory device in which the aforesaid problems are eliminated.

To achieve the object, in one illustrative embodiment of the present invention, a video memory device is provided with memory means, write control means for controlling writing to said memory means by utilizing a horizontal synchronizing signal of a video signal input to said memory means, and read control means for controlling reading from said memory means by utilizing a horizontal synchronizing signal of a video signal output from said memory means.

In this embodiment, the horizontal synchronizing signal is always written into the memory means from its leading end by the write control means, while, when the horizontal synchronizing signal is read out up to its leading edge, reading is again started from the leading address of the memory means. In this manner, the output signal of the memory means always starts with the leading end of one horizontal synchronizing signal in its one period, and ends with the leading edge of another horizontal synchronizing signal after the duration of an integral multiple of one horizontal period has passed. Accordingly, the output signal which is repeatedly read from the memory means, that is, the output signal of the present memory device, is formed as a skew-free signal in which horizontal synchronizing signals continuously appear.

Further objects, features and advantages of the present invention will become apparent from the following detailed description of an embodiment of the present invention with reference to the accompanying drawings.

DETAILED DESCRIPTION OF THE PREFERRED EMBODIMENT

A preferred embodiment of the present invention will be described in detail below with reference to the accompanying drawings.

Figure 1:
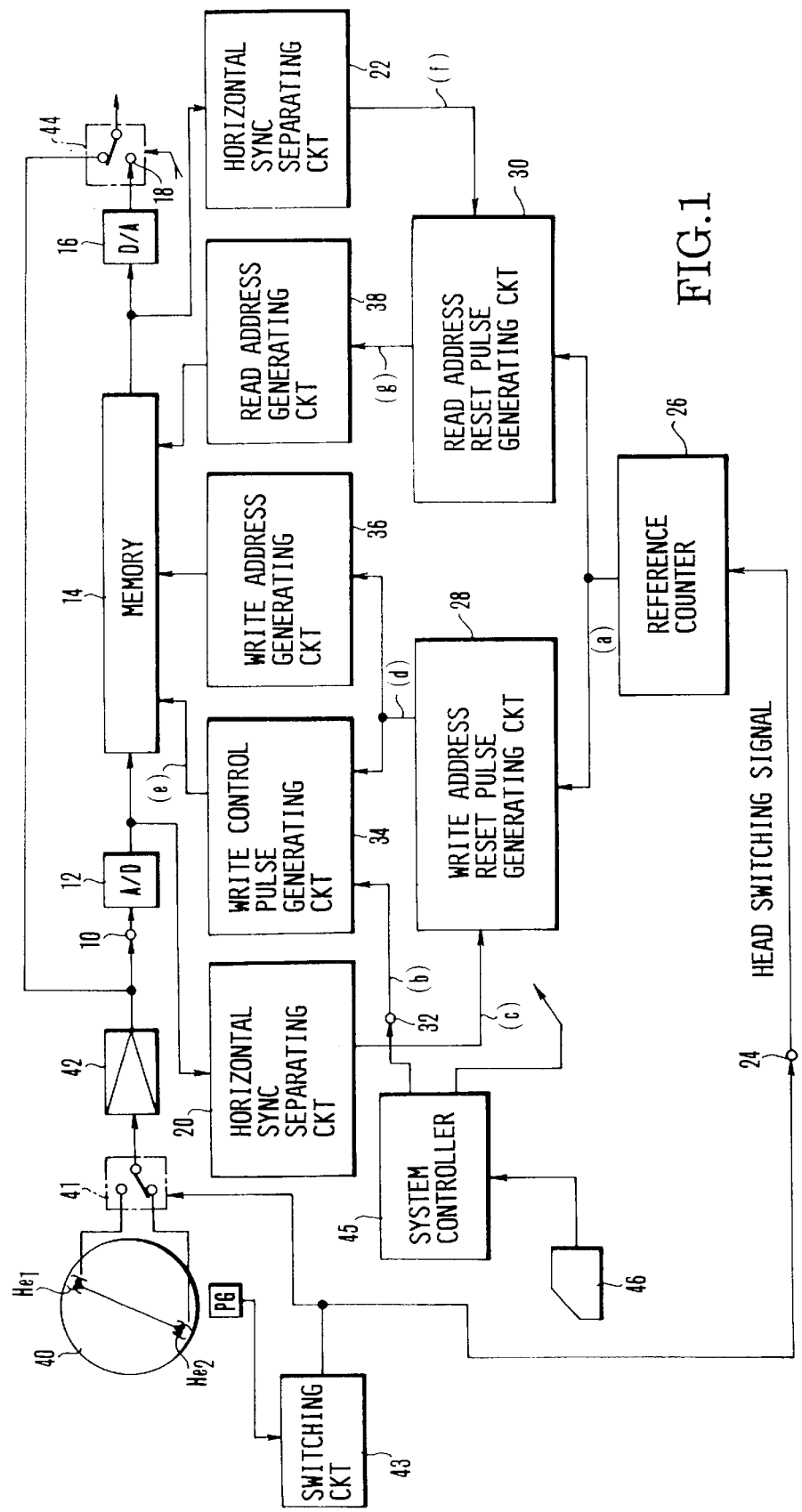
FIG. 1 is a block diagram showing one embodiment of the present invention.

FIG. 1 is a diagrammatic perspective view showing one embodiment of a field memory device of the present invention. The illustrated field memory device comprises the following major elements: an input terminal 10 for receiving a composite color video signal; an A/D converter 12 for digitizing the composite video signal supplied through the input terminal 10; a field memory 14; a D/A converter 16 for converting the signal output from the field memory 14 into an analog signal; an output terminal 18; a horizontal sync separating circuit 20 for separating a horizontal synchronizing signal from the output of the A/D converter 12; a horizontal sync separating circuit 22 for separating a horizontal synchronizing signal from the output of the field memory 14; an input terminal 24 for receiving a head switching signal for a rotary head 40; and a reference counter 26 arranged to be phase-controlled by the head switching signal from the input terminal 24 to form a one-field-period signal which serves as a reference signal. The horizontal sync separating circuit 22 normally outputs a signal having the frequency of a horizontal synchronizing signal. When the circuit 22 receives the output signal of the memory 14, the circuit 22 separates a horizontal synchronizing signal from the output signal for outputting purposes.

A pair of magnetic heads $H_{e1}$ and $H_{e2}$ is disposed on a rotary drum 40, and the reproduced outputs from the respective magnetic heads $H_{e1}$ and $H_{e2}$ are selectively supplied to the input terminal 10 through a switch 41 and a preamplifier 42.

The switch 41 for selectively supplying the reproduced outputs from the respective magnetic heads $H_{e1}$ and $H_{e2}$ is switched at intervals of approximately one field period (1/60 second for the NTSC standards) by a head switching signal which is output from the switching circuit 43 in accordance with a PG pulse obtained by sensing the rotation of the rotary drum 40. This switching signal is supplied to the aforesaid input terminal 24.

In the meantime, a signal which is output from the field memory 14 through the output terminal 18 or the amplified output of the preamplifier 42 is supplied through a switch 44 to a signal processing circuit (not shown) which follows the switch 44. The switching circuit 44 is appropriately switched by a switching signal supplied from a system controller 45, which will be described later.

The illustrated field memory device also comprises the following elements: a reset pulse generating circuit 28 for generating a write address reset pulse on the basis of the one-field-period signal output from the reference counter 26 and the horizontal synchronizing signal separated by the horizontal sync separating circuit 20; a reset pulse generating circuit 30 for generating a read address reset pulse on the basis of the one-field-period signal output from the reference counter 26 and the horizontal synchronizing signal separated by the horizontal sync separating circuit 22; an input terminal 32 for receiving a control signal output from, for example, the system controller 45 of a recording/reproducing apparatus; a write control pulse generating circuit 34 for generating a write control pulse which establishes if writing to the memory 14 is performed in response to the reset pulse from the write address reset pulse generating circuit 28; a write address generating circuit 36 for incrementing the write address of the memory 14 each time it is reset by the reset pulse output from the write address reset pulse generating circuit 28; and a read address generating circuit 38 for incrementing the read address of the memory 14 each time it is reset by the reset pulse output from the read address reset pulse generating circuit 30.

The control signal output from the system controller 45 is supplied to the input terminal 32 in response to the operation of an operating unit 46 connected to the system controller 45, for example, the operation of various special reproducing buttons such as a still-image reproducing button. The system controller 45 outputs a switching signal for switching the aforesaid switching circuit 44 in response to the operation of such a special reproducing button.

As is apparent from the foregoing, in the present embodiment, for normal reproduction, the output from the preamplifier 42 is supplied through the switching circuit 44 to the following signal processing circuit. For reproduction, such as special reproduction, which requires utilization of memory, the output from the aforesaid field memory 14 is supplied to the above signal processing circuit through the switching circuit 44.

Although, in the present embodiment, the signal processing circuit is disposed at the rear stage of the field memory 14, this signal processing circuit may be disposed at the front stage of the field memory 14 (at an intermediate position between an input terminal and the preamplifier 42). The horizontal synchronizing signal separated by the signal processing circuit may be supplied to the write address reset pulse generating circuit 28.

Figure 2:
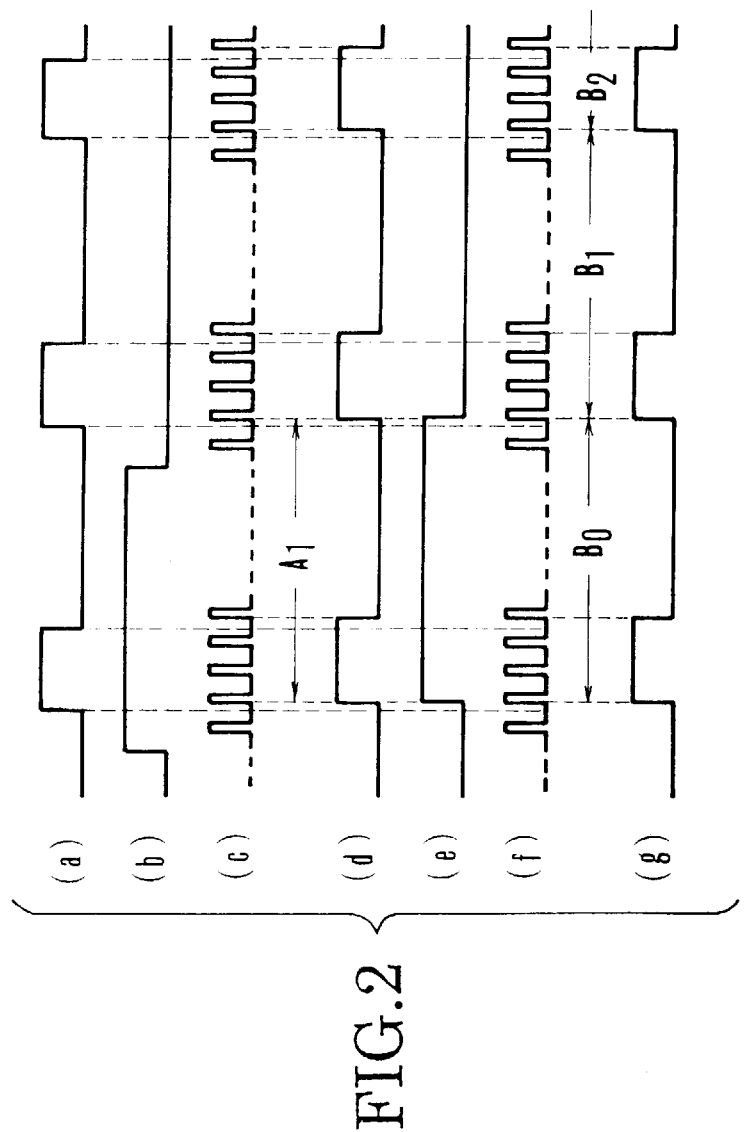
FIG. 2 a timing chart which serves to illustrate the embodiment of FIG. 1.

The operation of the field memory device of FIG. 1 will be explained with reference to stroboscopic reproduction in a VTR. FIG. 2 is a timing chart showing the stroboscopic reproduction and Parts (a)–(g) of FIG. 2 corresponding to signals (a)–(g) of FIG. 1, respectively.

A composite color video signal, input to the input terminal 10, is digitized by the A/D converter 12, and the horizontal sync separating circuit 20 outputs a horizontal synchronizing signal (c) to the write address reset pulse generating circuit 28. In the meantime, a signal (a) of one field period is applied to the write address reset pulse generating circuit 28 by the reference counter 26. The write address reset pulse generating circuit 28 generates a reset pulse (d), which is contained in the signal (a) of one field period and which rises in synchronism with the first horizontal synchronizing signal (shown in Part (c) of FIG. 2) contained in the signal input to the memory 14.

The write address generating circuit 36 supplies a write address to the memory 14 in response to the reset pulse (d). The write control pulse generating circuit 34 also generates a write control pulse (e). When the control signal (b) provided at the input terminal 32 indicates write, that is to say, when the control signal (b) is at its high level, the write control pulse (e) rises in response to the rising of the reset pulse (d). When the control signal (b) indicates non-write, that is, when the control signal (b) is at its low level, the write control pulse (e) falls in response to the rising of the reset pulse (d). The memory 14 reads its input signal when the write control pulse (e) is at its high level, that is to say, the memory 14 reads the input signal during a period $A_1$ of FIG. 2. Accordingly, the memory 14 reads a composite color video signal which continues from the leading end of a horizontal synchronizing signal to the leading end of the horizontal synchronizing signal which appears approximately one field later.

The horizontal sync separating circuit 22 separates a horizontal synchronizing signal (f) output from the memory 14 and supplies it to the read address reset pulse generating circuit 30. As in the case of writing, the signal (a) of one field period output from the reference counter 26 is also applied to the read address reset pulse generating circuit 30, and the read address reset pulse generating circuit 30 generates a reset pulse (g), which is contained in the signal (a) of one field period and which rises in synchronism with the first horizontal synchronizing signal (shown in Part (f) of FIG. 2) contained in the signal input to the memory 14. The write address generating circuit 38 applies a read address to the memory 14 while incrementing the read address in response to the reset pulse (g). Thus, after the signal which continues up to the leading end of the horizontal synchronizing signal has been read from the memory 14, the read address is reset and reading is subsequently repeated from the leading address.

As described above, the portion of a horizontal synchronizing signal which starts from the leading end thereof is written into the memory 14. Accordingly, even during the transition from a period $B_0$ to a period $B_1$ of FIG. 2, the horizontal synchronizing signal continues. This explanation also applies to the transition from the period $B_1$ to a period $B_2$.

As is apparent from the foregoing, the output signal of the field memory 14 is formed as a signal in which horizontal synchronizing signals continuously appear, that is, a signal free from a skew.

Although a composite color video signal itself is subjected to A/D conversion and written into the memory 14 in the above embodiment, the luminance and chrominance signals of the composite color video signal may be processed by individual memories or they may be processed in a time-shared manner. In such a case, writing and reading of the field memory may be controlled by using the horizontal synchronizing signal separated from the luminance signal.

Although the horizontal synchronizing signal is separated from the signal output from the A/D converter 12 and the signal input to the D/A converter 16, it may of course by separated from the analog video signals provided at the input terminal 10 and the output terminal 18.

As can be readily understood from the foregoing, according to the above embodiment, even if a video signal containing jitters is input, a video signal free from a skew can be output in units of video signals of duration of one scanning period. Accordingly, the above embodiment is very advantageous in the present situation where the image quality of each type of video equipment has been increasingly improved.

What is claimed is:

1. A video memory device for processing a digital video signal, comprising:
   (a) input means for inputting the digital video signal including a horizontal synchronizing signal;
   (b) memory means for storing the input digital video signal and providing an output stored digital video signal, said memory means storing the horizontal synchronizing signal with the digital video signal;
   (c) first separation means for separating the horizontal synchronizing signal from the digital video signal being written into said memory means;
   (d) second separation means for separating the horizontal synchronizing signal from the digital video signal being read out from said memory means;
   (e) write address generating means for assigning a write address of said memory means;
   (f) write address reset means for resetting an address generated by said write address generating means to a predetermined address at a timing synchronous with the horizontal synchronizing signal separated by said first separation means;
   (g) read address generating means for assigning a read address of said memory means; and
   (h) read address reset means for resetting an address generated by said read address generating means to a predetermined address at a timing synchronous with the horizontal synchronizing signal separated by said second separation means.

2. A device according to claim 1, wherein said write address reset means and said read address reset means are arranged to operate independently of each other.

3. A device according to claim 1, wherein said video memory device further includes generating means for generating a periodic signal having a predetermined period, and said write address reset means is arranged to reset the write address of said memory means to a predetermined address at a timing corresponding to a horizontal synchronizing signal of the digital input video signal, for every period of said periodic signal.

4. A device according to claim 1, wherein said video memory device further includes generating means for generating a periodic signal having a predetermined period, and said read address reset means is arranged to reset the read address of said memory means to a predetermined address at a timing corresponding to a horizontal synchronizing signal of the digital video signal output from said memory means, for every period of said periodic signal.

5. A device according to claim 4, wherein said period is one field period.

6. A device according to claim 1, wherein said digital video signal is a composite color video signal.

7. A video memory device for processing a digital video signal, comprising:
   (a) input means for inputting the digital video signal including a horizontal synchronizing signal;
   (b) memory means for storing the input digital video signal and providing an output stored digital video signal, said memory means storing the horizontal synchronizing signal with the digital video signal;
   (c) generating means for generating a periodic signal having a predetermined period;
   (d) first separation means for separating the horizontal synchronizing signal from the digital video signal being written into said memory means;
   (e) second separation means for separating the horizontal synchronizing signal from the digital video signal being read out from said memory means;
   (f) write address reset means for resetting a write address of said memory means to a predetermined address at a timing corresponding to the horizontal synchronizing signal separated by said first separation means for every period of said periodic signal; and
   (g) read address reset means for resetting a read address of said memory means to a predetermined address at a timing corresponding to the horizontal synchronizing signal separated by said second separation means for every period of said periodic signal, irrespective of said write address reset timing.

8. A device according to claim 7, wherein said period is one field period.

9. A video memory device for processing a digital video signal, comprising:
   (a) input means for inputting the digital video signal including a horizontal synchronizing signal;
   (b) memory means for storing the input digital video signal and providing an output stored digital video signal, said memory means storing the horizontal synchronizing signal with the digital video signal;
   (c) generating means for generating a periodic signal having a predetermined period;
   (d) separation means for separating the horizontal synchronizing signal from the digital video signal being read out from said memory means; and
   (e) read address reset means for resetting a read address of said memory means to a predetermined address at a timing corresponding to the horizontal synchronizing signal separated by said separation means for every period of said periodic signal.

10. A device according to claim 9, wherein said period is one field period.

11. A device according to claim 9, wherein said digital video signal is a composite color video signal.

12. A method of processing a digital video signal, the method comprising the steps of:
   (a) inputting the digital video signal including a horizontal synchronizing signal;
   (b) storing in a memory means the input digital video signal together with the horizontal synchronizing signal, and outputting the stored digital video signal;
   (c) first separating the horizontal synchronizing signal from the digital video signal being written into said memory means;
   (d) second separating the horizontal synchronizing signal from the digital video signal being read out from said memory means;
   (e) generating a write address of said memory means;
   (f) resetting the generated write address to a predetermined address at a timing synchronous with the horizontal synchronizing signal separated at said first separating step;
   (g) generating a read address of said memory means; and (h) resetting the generated read address to a predetermined address at a timing synchronous with the horizontal synchronizing signal separated at said second separating step.

13. A method of processing a digital video signal, the method comprising the steps of:

(a) inputting the digital video signal including a horizontal synchronizing signal;

(b) storing in a memory means the input digital video signal together with the horizontal synchronizing signal, and outputting the stored digital video signal;

(c) generating a periodic signal having a predetermined period;

(d) first separating the horizontal synchronizing signal from the digital video signal being written into said memory means;

(e) second separating the horizontal synchronizing signal from the digital video signal being read out from said memory means;

(f) resetting a write address of said memory means to a predetermined address at a timing corresponding to the horizontal synchronizing signal separated at said first separating step for every period of said periodic signal; and (g) resetting a read address of said memory means to a predetermined address at a timing corresponding to the horizontal synchronizing signal separated at said second separating step for every period of said periodic signal, irrespective of said write address reset timing.

14. A method of processing a digital video signal, the method comprising the steps of:

(a) inputting the digital video signal including a horizontal synchronizing signal;

(b) storing in a memory means the input digital video signal together with the horizontal synchronizing signal, and outputting the stored digital video signal;

(c) generating a periodic signal having a predetermined period;

(d) separating the horizontal synchronizing signal from the digital video signal being read out from said memory means; and (e) resetting a read address of said memory means to a predetermined address at a timing corresponding to the horizontal synchronizing signal separated at said second separating step for every period of said periodic signal.

* * * * *